United States Patent
Anzalone et al.

(10) Patent No.: US 10,997,670 B1
(45) Date of Patent: May 4, 2021

(54) SYSTEMS AND METHODS FOR A WHOLE LIFE INTERACTIVE SIMULATION

(71) Applicant: Wells Fargo Bank, N.A., San Francisco, CA (US)

(72) Inventors: Marjorie S. Anzalone, San Francisco, CA (US); Darius A. Miranda, San Francisco, CA (US); Wairnola Marria Rhodriquez, San Francisco, CA (US); Samundra Timilsina, South San Francisco, CA (US); Paul Vittimberga, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 60 days.

(21) Appl. No.: 16/149,673

(22) Filed: Oct. 2, 2018

(51) Int. Cl.
*G06Q 40/00* (2012.01)
*G06Q 10/08* (2012.01)
*G06Q 30/06* (2012.01)
*G06Q 20/12* (2012.01)

(52) U.S. Cl.
CPC ......... *G06Q 40/12* (2013.12); *G06Q 10/087* (2013.01); *G06Q 20/12* (2013.01); *G06Q 30/0631* (2013.01); *G06Q 30/0633* (2013.01); *G06Q 30/0635* (2013.01); *G06Q 30/0639* (2013.01); *G06Q 30/0641* (2013.01)

(58) Field of Classification Search
CPC ........... G06Q 30/0633; G06Q 30/0639; G06Q 30/0631; G06Q 30/0641; G06Q 10/087; G06Q 20/12; G06Q 30/0635
See application file for complete search history.

(56) References Cited

U.S. PATENT DOCUMENTS 5,963,948 A * 10/1999 Shilcrat ............... G06F 16/748
707/E17.013
6,890,179 B2 5/2005 Rogan et al.
(Continued)

FOREIGN PATENT DOCUMENTS

WO WO-2008/115431 A1 9/2008
WO WO-2014/104970 A1 7/2014

OTHER PUBLICATIONS

Hutton, Robert; "The Gamification of Finance", Topia-Canadian Journal of Cultural Studies, Issue 30-31, Sep. 8, 2017. 11 pages.
(Continued)

*Primary Examiner* — Peter Ludwig
(74) *Attorney, Agent, or Firm* — Foley & Lardner LLP

(57) ABSTRACT

Examples described herein relate to apparatuses and methods for providing an interactive computer simulation of a life of a user via a user device operated by the user by determining a goal of the user, accessing a transaction history of the user, determining an initial state of the user based on the transaction history of the user, determining a virtual path to the goal, the initial state of the user being a starting point of the virtual path to the goal, configuring the user device to display the virtual path of the goal, determining that the user has selected at least one of selectable in-simulation decisions, updating the virtual path to generate an updated virtual path based on the selected at least one of the plurality of selectable in-simulation decisions, and configuring the user device to display the updated virtual path.

21 Claims, 8 Drawing Sheets

(56) References Cited

U.S. PATENT DOCUMENTS

| | | | |
|---|---|---|---|
| 7,734,507 B2* | 6/2010 | Ritter | G01S 5/0289 |
| | | | 705/26.9 |
| 7,819,315 B1* | 10/2010 | Pienkos | G06Q 10/087 |
| | | | 235/383 |
| 8,429,026 B1* | 4/2013 | Kolawa | G06Q 30/00 |
| | | | 705/26.7 |
| 8,480,399 B2 | 7/2013 | Koreny | |
| 8,821,272 B2 | 9/2014 | Thomas et al. | |
| 8,838,499 B2 | 9/2014 | Del Bene et al. | |
| 9,595,062 B2* | 3/2017 | Goulert | G06Q 30/0633 |
| 9,940,661 B2* | 4/2018 | Gibson | G06Q 30/0631 |
| 10,248,978 B2* | 4/2019 | Eramian | G06Q 30/06 |
| 10,497,036 B2* | 12/2019 | Todasco | G06Q 30/0639 |
| 2005/0096973 A1 | 5/2005 | Heyse et al. | |
| 2006/0026036 A1 | 2/2006 | Mahmood | |
| 2006/0085217 A1 | 4/2006 | Grace | |
| 2008/0201269 A1 | 8/2008 | Hollins et al. | |
| 2009/0048767 A1* | 2/2009 | Vaughn | G01Q 21/3415 |
| | | | 701/117 |
| 2009/0055249 A1 | 2/2009 | Lieberman | |
| 2009/0138355 A1 | 5/2009 | Jung et al. | |
| 2009/0182499 A1* | 7/2009 | Bravo | G01C 21/20 |
| | | | 701/408 |
| 2009/0192875 A1 | 7/2009 | Bene et al. | |
| 2010/0114662 A1 | 5/2010 | Jung et al. | |
| 2010/0248192 A1 | 9/2010 | Thompson et al. | |
| 2010/0311018 A1 | 12/2010 | Magers | |
| 2011/0224896 A1* | 9/2011 | Napieraj | G01C 21/3614 |
| | | | 701/532 |
| 2013/0103539 A1* | 4/2013 | Abraham | G06Q 30/0633 |
| | | | 705/26.8 |
| 2014/0164124 A1* | 6/2014 | Rhoads | H04W 4/029 |
| | | | 705/14.58 |
| 2014/0172640 A1* | 6/2014 | Argue | G06Q 30/0641 |
| | | | 705/26.61 |
| 2014/0207615 A1* | 7/2014 | Li | G06Q 30/0623 |
| | | | 705/26.61 |
| 2014/0295381 A1 | 10/2014 | Bhaskaramurthy et al. | |
| 2015/0006319 A1* | 1/2015 | Thomas | G06Q 30/0633 |
| | | | 705/26.8 |
| 2015/0269645 A1* | 9/2015 | Gibson | G06Q 30/0631 |
| | | | 705/26.7 |
| 2016/0335724 A1 | 11/2016 | Mak | |
| 2020/0005385 A1* | 1/2020 | Stout | G06Q 20/3278 |

OTHER PUBLICATIONS

Stefanel et al., "The Gamification of Financial Services: Current Trends and Future Possibilities", APIS Partners, https://www.google.com/url?sa=t&rct=j&q=&esrc=s&source=web&cd=7&cad=rja&uact=8&ved=0ahUKEwjlpZfkpsbXAhVm4YMKHUIGDFcQFghqMAY&url=https%3A%2F%2Fapis.pe%2Fdownloads%2Fapis_gamification_report_v5.pdf&usg=AOvVaw3At8iHxU8C59UpLr0Enx_G 20 pages.

* cited by examiner

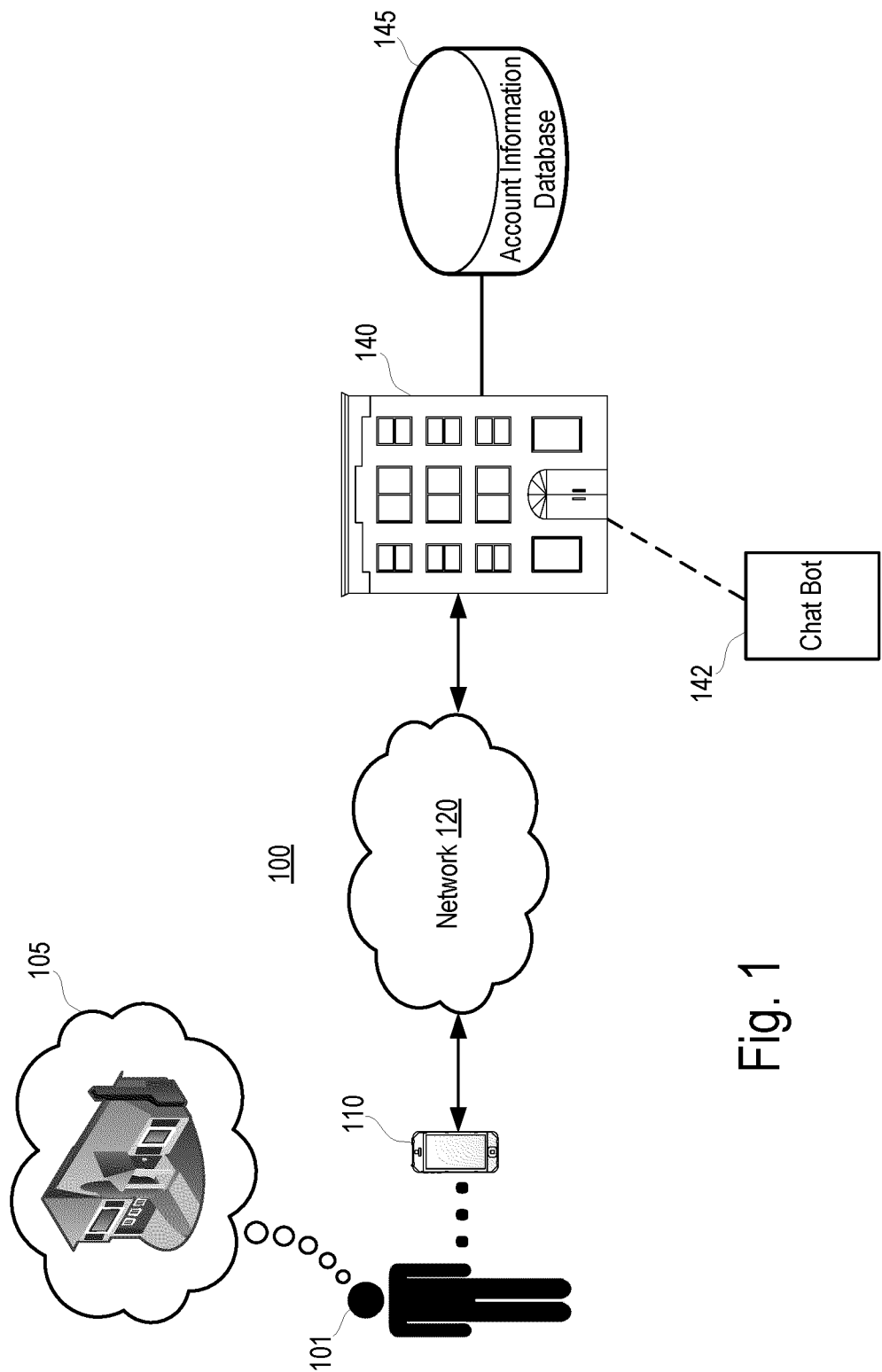

US 10,997,670 B1

SYSTEMS AND METHODS FOR A WHOLE LIFE INTERACTIVE SIMULATION

BACKGROUND

The hallmarks of fiscal responsibility include the ability to plan and manage financial risks. In real life, once a financial decision is made, it is often very difficult to backtrack and rollback the decision. It may not always be obvious what decisions (e.g., actions or sacrifices) one needs to make to reach a particular goal. It is crucial for someone to learn fiscal responsibility through actually making financial decisions that may be less than sound. Consulting with a human advisor is undesirable or unpractical for many individuals for many reasons, including the expense and inconvenience of such consultations. Consulting with a human adviser is especially infeasible for every financial and life decision that someone makes.

SUMMARY

In some arrangements, a method includes providing an interactive computer simulation of a life of a user via a user device operated by the user. Providing the interactive computer simulation includes determining a goal of the user, accessing a transaction history of the user, determining an initial state of the user based on the transaction history of the user, determining a virtual path to the goal, the initial state of the user being a starting point of the virtual path to the goal, configuring the user device to display the virtual path of the goal, the virtual path includes the starting point of the virtual path to the goal and a plurality of selectable in-simulation decisions configured to be selected by the user via the user device, determining that the user has selected at least one of the plurality of selectable in-simulation decisions, updating the virtual path to generate an updated virtual path based on the selected at least one of the plurality of selectable in-simulation decisions, and configuring the user device to display the updated virtual path.

In some arrangements, a provider computing system includes a processing circuit having a processor and a memory. The processing circuit is configured to provide an interactive computer simulation of a life of a user via a user device operated by the user by determining a goal of the user, accessing a transaction history of the user, determining an initial state of the user based on the transaction history of the user, determining a virtual path to the goal, the initial state of the user being a starting point of the virtual path to the goal, configuring the user device to display the virtual path of the goal, the virtual path includes the starting point of the virtual path to the goal and a plurality of selectable in-simulation decisions configured to be selected by the user via the user device, determining that the user has selected at least one of the plurality of selectable in-simulation decisions, updating the virtual path to generate an updated virtual path based on the selected at least one of the plurality of selectable in-simulation decisions, and configuring the user device to display the updated virtual path.

In some arrangements, a non-transitory computer-readable medium having processor-readable instructions stored thereon such that, when executed by a processor, the instructions cause the processor to provide an interactive computer simulation of a life of a user via a user device operated by the user by determining a goal of the user, accessing a transaction history of the user, determining an initial state of the user based on the transaction history of the user, determining a virtual path to the goal, the initial state of the user being a starting point of the virtual path to the goal, configuring the user device to display the virtual path of the goal, the virtual path includes the starting point of the virtual path to the goal and a plurality of selectable in-simulation decisions configured to be selected by the user via the user device, determining that the user has selected at least one of the plurality of selectable in-simulation decisions, updating the virtual path to generate an updated virtual path based on the selected at least one of the plurality of selectable in-simulation decisions, and configuring the user device to display the updated virtual path.

These and other features, together with the organization and manner of operation thereof, will become apparent from the following detailed description when taken in conjunction with the accompanying drawings.

BRIEF DESCRIPTION OF THE FIGURES

FIG. 1 is a diagram of an example of a system for providing an interactive computer simulation of a life of a user via a user device operated by the user, according to some arrangements.

DETAILED DESCRIPTION

Figure 2B:
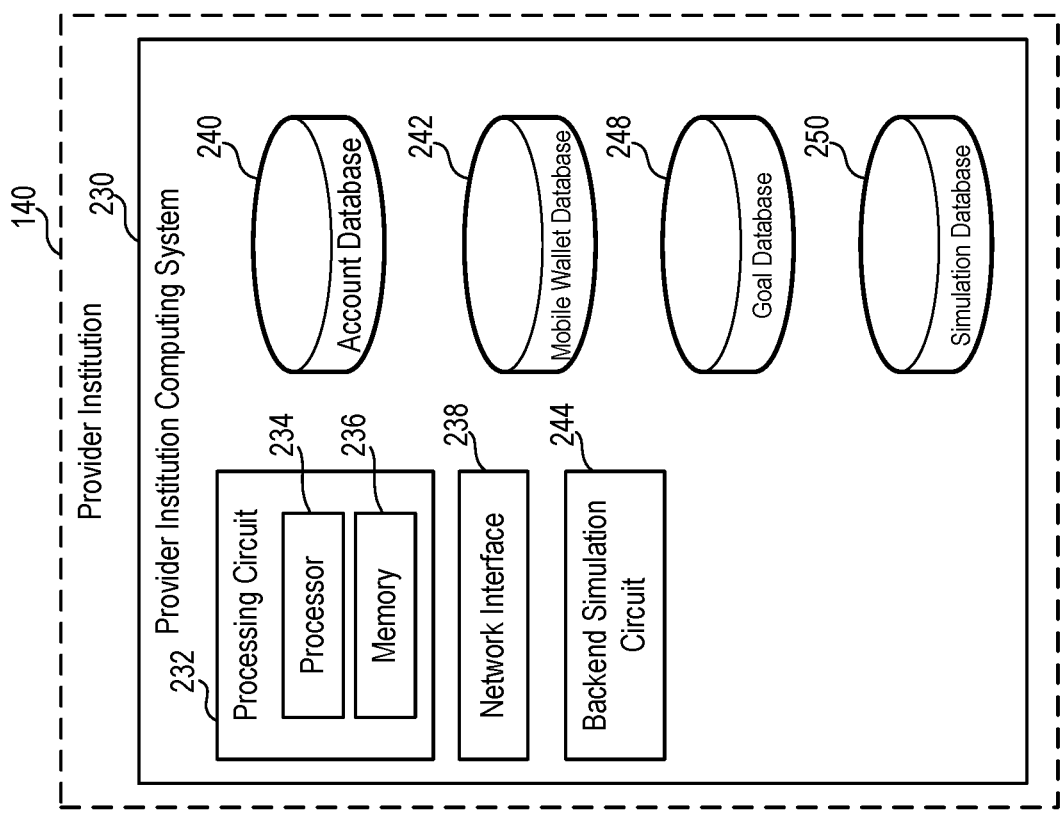
FIG. 2B is a diagram of a provider computing system according to some arrangements.

Arrangements described herein relate to systems, apparatuses, and methods for assisting a user with visualizing, determining, and achieving goals (e.g., financial goals) by providing an interactive computer simulation that represents a life of the user. The interactive computer simulation can be configured as a computer game or software in which different goals and decisions (e.g., financial decisions, life decisions, and the like) can be set and 'played' through by the user (e.g., in a roleplay manner) in order to for the user to experience different paths to achieve the goals. Scenarios can be loaded and played by the user. The decisions made by the user in the interactive computer simulation can be tracked against the user's actual decisions to see how closely the user is following the roleplayed scenario. The user can experience different tradeoffs for decisions by roleplaying in the interactive computer simulation before actually committing to such decisions in real life. The interactive computer simulation can also be used as a financial literacy tool for children. For example, interactive computer simulation may include a tutorial mode that is interactive and suggests financially sound decisions and strategies to the user. The tutorial mode is customizable to emphasize certain values or goals.

For example, once a desired path has been simulated or played by the user, the user can turn on the connection to real life (e.g., to virtual banking), such that financial decisions or actions taken in the interactive computer simulation can be completed in real life.

In that regard, the interactive computer simulation described herein allows the user to experience financial decisions in the context of the interactive computer simulation before taking the risk of executing those financial decisions. The interactive computer simulation further provides better tracking of goals given that a full interactive computer simulation (e.g., which can be a full-life simulation) can be used to compare against real life events of the user.

In some arrangements, the interactive computer simulation can be configured to generate one or more paths for the user to achieve at least one defined goal. The one or more paths can be configured and displayed in a structured format, such as a depiction of decision nodes. In one example, a user may define (e.g., via a suitable user input device) a goal of purchasing a new car in a year at an interest rate of under 2%. The one or more paths corresponding to decisions that need to be made to achieve the goal can be generated and graphically depicted as nodes that connect a current status of the user to the final goals. In some examples, the nodes may be software objects with underlying measures and parameters. The parameters can be filled in automatically based on what information the interactive computer simulation can access about the user and/or what the interactive computer simulation can be configured to determine about the user by analyzing financial data. As the user makes decisions in the interactive computer simulation, nodes can be generated (and appear graphically) or removed (and disappear graphically) corresponding to the consequences of the decisions. Therefore, the nodes can be 'played' by the user such that the user can see what decisions need to be made and in what manner to reach the goal. In some examples, the goals defined may be immediate such that decision nodes that the user currently qualifies for are displayed. In some examples, the goals may be speculative or forward-thinking, such that decision nodes may be available in the future are displayed. As such, the interactive nodes can change based on previous in-simulation decisions made by the user. In other examples, the interactive nodes can change based on actual decisions made by the user in real life, as the actual decisions can be tracked by the platform supporting the interactive computer simulation.

The arrangements of the interactive computer simulation system described herein improve computer-related technology by performing certain steps that cannot be done by conventional advising systems or human actors. For example, the interactive computer simulation system is configured to determine various paths or nodes (steps) to achieve one or more defined goal. Accurate and realistic determination of paths or nodes (steps) is facilitated by generating and gathering of context information and account information. In some arrangements, to achieve benefits over conventional systems having databases, table, and field definitions that are static, the databases of the interactive computer simulation described herein may be data-type agnostic and configured to store different information for different users, transaction types, etc. Furthermore, to achieve benefits over conventional databases and to solve a technical problem of improving dimensional scalability (such that different aspects of transactions and decisions may be analyzed for different users on the same data storage infrastructure as the interactive computer simulation learns the relevant aspects through pattern mining), and faster advising services by reducing computer processing times for analyzing the decisions of users receiving such services, the data stored in multidimensional form may be aggregated and/or stored using improved methods.

In an example arrangement, the interactive computer simulation includes a particular and unique set of rules, which are set up to account for and learn from account activities and to produce an accurate paths to achieve the goal and nodes (steps) on those paths that traditionally would have required human intervention. Further, arrangements described herein solve the internet-centric problem of automating financial education services and providing these services in a convenient manner (e.g., via a mobile device of a user using display and input functionalities, push notifications, messages, or other alerts).

In addition, arrangements described herein solve the technical problem of determining the appearance and functionality of an electronic user interface providing real time alerts of a customer's status. In some arrangements, alerts can be displayed with a single click.

Herein, "automatic" is defined as pertaining to an electronically carried out action that does not require outside (either human or machine) intervention to be scheduled, triggered, executed, and/or completed.

As used herein, an "in-simulation decision" refers to a decision made by a user within the interactive computer simulation or a gamified version thereof, for example, by selecting user interactive elements displayed by an input device of a user device (e.g., a computer, a smartphone, a virtual reality (VR) device, an augmented reality (AR) device, or the like). An in-simulation decision is virtual in nature and has not occurred in real life. An in-simulation decision can be converted into an actual decision, as the user device can be connected to, for example, online merchants, virtual banking, or online banking, such that in-simulation decisions can be completed as actual decisions or actions in real life, in the manner described.

As used herein, an "actual decision" refers to a decision made by a user in real life. Actual decision includes financial decisions (e.g., purchasing goods and services, investing, saving, banking, gifting, and the like) and life decisions (e.g., having a child, going to college, re-locating, becoming employed, and the like). An actual decision can be imported into the interactive computer simulation or a gamified version thereof so that the actual decision can be converted into an in-simulation decision to affect the outcome of the simulation. For example, the path or nodes to the goal may change (e.g., appear or disappear).

FIG. 1 is a diagram of an example of a system 100 for providing an interactive computer simulation of a life of a user 101 via a user device 110 operated by the user 101, according to some arrangements. Referring to FIG. 1, a user 101 is a customer or potential customer of a provider institution 140, or at least a user of the interactive computer simulation of a gamified version thereof. The user 101 can be any entity (e.g., an individual, a company, or the like). In some examples, the provider institution 140 is a financial institution. In some arrangements, the user 101 is a customer or potential customer of one or more other provider institutions (e.g., other financial institutions) not shown. The provider institution 140 (as well as other financial institutions) can store account information of the user 101, for example, in an account information database 145. In some arrangements, the account information database 145 is a financial information database. The provider institution 140 can collect and store the account information in the course of dealing (e.g., processing transactions, offering products/services, and the like) with the user 101. Likewise, the provider institution 140 can collect and store account information of other users as well. While the provider institution 140 is depicted as brick and mortar locations in FIG. 1, one of ordinary skill in the art can appreciate that one or more of the provider institution 140 may not be associated with brick and mortar locations.

As used herein, "account information" of the user 101 includes information about assets, liabilities, and activities of the user 101. Examples of types of account information include but are not limited to, account types (e.g., saving, credit, checking, investment, retirement, mortgage, rewards, and the like), account balances, account activities, transaction history, auto-pay preferences, income, debt, saving, mortgage, and the like. Given that the user 101 can hold accounts in more than one provider institution, the account information of the user 101 may be stored in two or more databases managed by two or more provider institutions. While one provider institution 140 is shown for illustrative purposes, one of ordinary skill in the art can appreciate that the entirety of the account information of the user 101 can be spread across and stored with two or more provider institutions.

The user 101 has one or more goals, represented in FIG. 1 as a goal 105. While the goal 105 is presented as owning/buying a home in FIG. 1, one of ordinary skill in the art can appreciate that the goal 105 can be any suitable goal(s). As used herein, the goal 105 of the user 101 refers to a future status reflective of a need or desire of the user 101. The goal 105 is typically associated with a capability for the user 101 to purchase goods and services in the future. In some arrangements, the user 101 can explicitly state the goal 105 via an input device (e.g., an input circuit 210 shown in FIG. 2A) of a user device 110, in the manner described herein. In other arrangements, a provider institution computing system (e.g., the provider institution computing system 230 of FIG. 2B) can be configured to determine the goal 105 based on the account information of the user 101 in the manner described. The goal 105 can change over time.

As used herein, "context information" refers to data associated with the goal 105 and includes data based on which a future monetary value of the goal 105 can be calculated, if the future monetary value of the goal 105 is not explicitly stated. Examples of the context information include but are not limited to, interest rates, market fluctuation, consumer price index, stock market information, location information (e.g., local housing market prices, school district information, local price indexes, and the like), and the like. In particular, the context information can be projected and extrapolated for a stated timeframe (the desired realization time) associated with the goal 105 to determine the future monetary value associated with the goal 105, based on suitable predictive models. Different types of models (e.g., housing market models and stock market models) can be implemented for different types of goals (e.g., buying a home and investing in the stock market, respectively).

The user 101 operates the user device 110. The user device 110 is connected to the provider institution 140 (e.g., the provider institution computing system 230 of FIG. 2B) via a communication network 120 to access goods and services provided by the provider institution 140. In some arrangements, the user device 110 is further connected to the provider institution 150 (e.g., a provider institution computing system similar to that shown in FIG. 2B) via the communication network 120 to access products and services provided by the provider institution 150.

The communication network 120 is any suitable Local Area Network (LAN) or Wide Area Network (WAN). For example, the communication network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combinations thereof, and/or the like. The communication network 120 is structured to permit the exchange of data, values, instructions, messages, and the like among the user device 110, the provider institution 140, and the provider institution 150.

The provider institution 140 can employ a chat bot 142 for assisting the user 101 with inputting information to the interactive computer simulation. The chat bot 142 is an A system configured to receive user input from the user 101 that corresponds to an inquiry for determining the goal of the user 101 or determining the virtual path (e.g., the selectable in-simulation decisions). The chat bot 142 can further assist with purchasing of goods or services by negotiating with online merchants and/or third-party merchant applications to obtain a more favorable deal for the user 101.

Figure 2A:
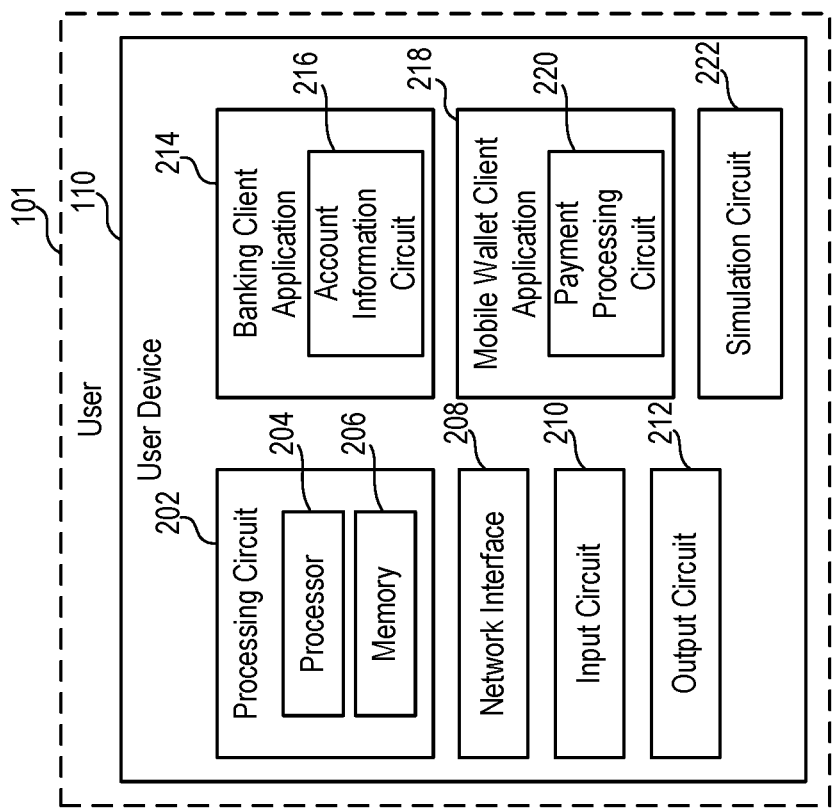
FIG. 2A is a diagram of a user device of the system shown in FIG. 1 according to some arrangements.

FIG. 2A is a diagram of an example of the user device 110 of the system 100 set forth in FIG. 1 according to some arrangements. FIG. 2B is a diagram of an example of the provider institution computing system 230 according to some arrangements. Referring to FIGS. 1-2B, the provider institution 140 includes one or more of a bank branch, loan office, mortgage office, services office, retail office, automated teller machine (ATM) location, a combination thereof, and/or the like. The provider institution 140 has at least one associated provider institution computing system 230. In some examples, the provider institution computing system 230 is a financial institution computing system.

The provider institution 140 provides products and services such as, but not limited to, credit card accounts, mobile wallet, checking/saving accounts, retirement accounts, mortgage accounts, loan accounts, investment and accounts, and the like to the user 101 via the provider institution computing system 230.

The provider institution computing system 230 includes a processing circuit 232 composed of a processor 234 and a memory device 236. The processor 234 can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 236 can be implemented with a Random Access Memory (RAM), Read-Only Memory (ROM), Non-volatile RAM (NVRAM), Flash Memory, hard disk storage, cloud storage, and other suitable electronic storage devices. The memory 236 stores data and/or computer code for facilitating at least some of the various processes described herein. The memory 236 includes tangible, non-transient volatile memory, or non-volatile memory. The memory 236 stores programming logic that, when executed by the processor 234, controls the operations of the provider institution computing system 230. In some arrangements, the processor 234 and the memory 236 form various processing circuits in the provider institution computing system 230.

As shown, the provider institution computing system 230 includes a network interface 238. The network interface 238 is structured for sending and receiving data over the communication network 120 (e.g., to and from the user device 110, another provider institution computing system associated with the provider institution 140, and the like). Accordingly, the network interface 238 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The provider institution computing system 230 includes an account database 240 that stores customer information and account information relating to one or more accounts held by the user 101 with the provider institution 140. In this regard, more than one provider institution with an associated provider institution computing system (such as, but not limited to, the provider institution computing system 230) can be communicably coupled to the components of FIG. 2 over the communication network 120 to access the accounts held by the user 101, and vice versa. The account database 240 stores transaction history of transactions made by the user 101 using one or more accounts of the user 101, for example, with a banking client application 214, a mobile wallet client application 218, or with other suitable applications.

The provider institution computing system 230 includes a mobile wallet account database 242 for storing mobile wallet accounts of customers, including the user 101. The mobile wallet accounts permit payments via the mobile wallet client application 218 of the user device 110. The mobile wallet account database 242 stores transaction history of transactions made by the user 101 using the mobile wallet client application 218.

The account information database 145 of the provider institution 140 includes the account database 240, the mobile wallet database 242, and other databases that store the account information of the user 101. Similarly, the account information database 155 of the provider institution 150 can include a similar account database, a mobile wallet database, and other databases that store the account information of the user 101.

The provider institution computing system 230 includes a backend simulation circuit 244. The backend simulation circuit 244 can be configured to determine the goal 105 of the user 101, determine the virtual path to the goal 105, and/or update the virtual path in the manner described. In addition, the backend simulation circuit 244 can be configured to gather the account information of the user 101 locally from the account information database 145, the account database 240, the mobile wallet database 242, and other databases managed by or coupled to the provider institution computing system 230. For example, the backend simulation circuit 244 is coupled to one or more of the account database 240 and the mobile wallet database 242 to access (e.g., query) the account information stored thereon. The backend simulation circuit 244 can also be configured to gather the account information of the user 101 from other provider institutions. For instance, the backend simulation circuit 244 can be configured to query a remote account information database for the account information of the user 101 with suitable Application Programming Interfaces (APIs). The backend simulation circuit 244 is operatively coupled to one or more of the components of the provider institution computing system 230. For example, the backend simulation circuit 244 is coupled to the network interface 238 for communicating with the user device 110.

In some arrangements, the backend simulation circuit 244 can be configured to send instructions, codes, objects, data, and other information to the user device 110 (e.g., to the simulation circuit 222), such that the simulation circuit 222 can cause the output circuit 212 to display or otherwise output audiovisual content corresponding to the interactive computer simulation, and such that the simulation circuit 222 can cause the input circuit 212 to receive user input for the interactive computer simulation. As such, any action performed by one or more components (e.g., the input circuit 210, the output circuit 211, and the like) of the user device 110 configured to provision the interactive computer simulation can be caused by the instructions, codes, objects, data, and other information sent by the backend simulation circuit 244.

In some examples, the backend simulation circuit 244 is implemented with the processing circuit 232. For example, the backend simulation circuit 244 can be implemented as a software application stored within the memory 236 and executed by the processor 234. Accordingly, such examples can be implemented with minimal or no additional hardware costs. However, other implementations rely on dedicated hardware specifically configured for performing operations of the backend simulation circuit 244.

The provider institution computing system 230 includes a goal database 248 for storing goals (such as but not limited to, the goal 105) of the users (such as but not limited to, the user 101). Upon receiving user-defined goals from the user device 110 or upon determining automatically defined goals, the backend simulation circuit 244 relays the goals to the goal database 248 to be indexed and stored. As such, the goal database 248 can store goals of multiple users. Identification information (e.g., personal identification information, demographics information, financial information, and the like) of the users may also be stored in connection with respective goals of the users, such that searching the goal database 248 using identification information of the user 101 can identify goals of other users having the same or similar background (e.g., similar identification information) as that of the user 101.

In some arrangements, the goal database 248 can store in-simulation decisions generated by users (such as but not limited to, the user 101). As described, the users (including the user 101) can define selectable in-simulation decisions to reach respective goals. Once the users define those selectable in-simulation decisions (e.g., via user devices such as the user device 110), the selectable in-simulation decisions can be sent to the provider institution computing system 230 to be stored in the goal database 248. In some examples, instead of selectable in-simulation decisions, the selected in-simulation decisions of the users that define various paths to reach various respective goals can be sent to the provider institution computing system 230 to be stored in the goal database 248. The selected in-simulation decisions define virtual paths actually selected by the users. In some examples, the goal database 248 can store actual decisions made by the users to reach respective goals. For example, the backend simulation circuit 244 can be configured to determine from the information stored in the account information database 145 that a user who periodically (e.g., monthly) saved a same portion (e.g., 5%, 10%, or 30%) of the user's income into a saving account used the entire amount saved in the saving account as a down payment for a home a number of years (e.g., 1 year, 3 years, 5 years, or 10 years) since the date that the first amount was saved that the periodic savings correspond to the actual decisions for reaching the goal of saving enough down payment for a home within a predetermined period. As such, the goal database 248 can store multiple users' virtual paths (including one or more of selectable in-simulation decisions, selected in-simulation decisions, and actual decisions) corresponding to respective goals. Identification information (e.g., personal identification information, demographics information, financial information, and the like) of the users may also be stored in connection with respective virtual paths of the users, such that searching the goal database 248 using identification information of the user 101 can identify virtual paths corresponding to various goals of other users having the same or similar background (e.g., similar identification information) as that of the user 101.

In some arrangements, the goal database 248 can store libraries of predetermined templates of selectable in-simulation decisions. The predetermined templates of selectable in-simulation decisions are generated in advance to correspond go a variety of goals. The backend simulation circuit 244 can search the goal database 248 to check if predetermined templates of selectable in-simulation decisions exist for the goal 105 of the user 101. Responsive to determining that the predetermined templates of selectable in-simulation decisions exist for the goal 105, the predetermined templates can be sent to the user device 110 as the selectable in-simulation decisions to be selected by the user 101.

The provider institution computing system 230 includes a simulation database 250 for storing simulation-related instructions, codes, objects, data, and other suitable information used to provide the interactive computer simulation. For example, the backend simulation circuit 244 can be configured to send the simulation-related instructions, codes, objects, data, and other suitable information to the user device 110, such that the user device 110 (e.g., the simulation circuit 222, the input circuit 210, and the output circuit 212) can provide the interactive computer simulation to the user 101. The simulation-related instructions, codes, objects, data, and other suitable information correspond to graphics, sounds, display templates, texts, and the like.

As shown, the user 101 operates or is associated with the user device 110. Examples of the user device 110 include but are not limited to, a computer, a smartphone, a tablet, a VR device, an AR device, or the like. In some arrangements, the user device 110 includes a processing circuit 202 having a processor 204 and memory 206. The processor 204 can be implemented with a general-purpose processor, an ASIC, one or more FPGAs, a DSP, a group of processing components that are distributed over various geographic locations or housed in a single location or device, or other suitable electronic processing components. The memory 206 can be implemented with RAM, NVRAM, ROM, Flash Memory, hard disk storage, and other suitable electronic storage components. The memory 206 stores data and/or computer code for facilitating the various processes described herein. Moreover, the memory 206 is or includes tangible, non-transient volatile memory or non-volatile memory. Accordingly, the memory 206 includes database components, object code components, script components, or any other type of information structure for supporting the various activities and information structures described herein.

The user device 110 is shown to include various circuits and logic for implementing the activities described herein. More particularly, the user device 110 includes one or more of the processing circuit 202, network interface 208, input circuit 210, output circuit 212, the banking client application 214, the mobile wallet client application 218, the simulation circuit 222, and the like. While various circuits, interfaces, and logic with particular functionality are shown, it should be understood that the user device 110 includes any number of circuits, interfaces, and logic for facilitating the functions described herein. For example, the activities of multiple circuits are combined as a single circuit and implemented on a same processing circuit (e.g., the processing circuit 202), as additional circuits with additional functionality are included.

The network interface 208 is configured for and structured to establish a communication session via the communication network 120 with the provider institution computing system 230. Accordingly, the network interface 208 is an interface such as, but not limited to, the network interface 238.

The input circuit 210 is configured to receive user input the user 101. The output circuit 212 is configured to output information in the form of graphics, sound, tactile feedback (e.g., vibrations), and the like. In this regard, the input circuit 210 and the output circuit 212 are structured to exchange data, communications, instructions, etc. with an input/output component of the user device 110. Accordingly, in some arrangements, the input circuit 210 and the output circuit 212 can be combined into an input/output circuit that includes or is coupled to an input/output device such as but not limited to, a display device, touchscreen, keyboard, microphone, and/or the like. In some arrangements, the input/output circuit includes communication circuitry for facilitating the exchange of data, values, messages, and the like between the input/output device and the components of the user device 110. In some arrangements, the input circuit 210 and the output circuit 212 include machine-readable media for facilitating the exchange of information between the input/output device and the components of the user device 110. In still another arrangement, the input circuit 210 and the output circuit 212 include any combination of hardware components (e.g., a touchscreen), communication circuitry, and machine-readable media. As described, the input circuit 210 and the output circuit 212 can take the form of a VR device, an AR device, a wearable viewing device (e.g., a goggle), and the like.

One or more of the banking client application 214 and mobile wallet client application 218 are server-based applications executable on the user device 110. In this regard, the user 101 first downloads the application(s) prior to usage. In another arrangement, the banking client application 214 and/or mobile wallet client application 218 are coded into the memory 206 of the user device 110. In still another arrangement, the banking client application 214 and/or mobile wallet client application 218 are web-based interface applications. In this configuration, the user 101 logs onto or otherwise accesses the web-based interface before usage. In this regard, at least one of the banking client application 214 and mobile wallet client application 218 is supported by a separate computing system comprising one or more servers, processors, network interface modules, etc. that transmit the applications for use to the user device 110. In certain arrangements, one or more of the banking client application 214 and/or mobile wallet client application 218 include an API and/or a Software Development Kit (SDK) that facilitate integration of other applications. All such variations and combinations are intended to fall within the spirit and scope of the present disclosure.

The banking client application 214 is communicably coupled to the provider institution computing system 230 (e.g., the account database 240) via the communication network 120 and is structured to permit management of at least one account of the user 101 via the banking client application 214. In this regard, the banking client application 214 provides displays indicative of account information such as, but not limited to, current account balances, pending transactions, profile information (e.g., contact information), reward associated with the account, bill pay information and/or the like. Further, in some arrangements, the banking client application 214 is configured to process payments from the user 101 to a designated recipient. For example, the banking client application 214 depicts a loan (e.g., mortgage) of the user 101 and allows the user 101 to pay the loan from an account (e.g., checking or savings). In some examples, a bill pay option is provided by the banking client application 214, where the bill pay option allows the user 101 to pay his/her bills in response to user input.

As mentioned herein, via the banking client application 214, the user 101 pays bills (e.g., mortgage), view balances, pays merchants, and otherwise manage accounts. Accordingly, and as shown, the mobile bank client application 214 includes an account information circuit 216. The account information circuit 216 is linked or otherwise coupled to one or more accounts (as stored in the account database 240) held by the user 101 and permit management of the associated accounts (e.g., transfer balances between accounts, view payment history) by communicating with the provider institution computing system 230. The banking client application 214 is communicably coupled to the mobile wallet client application 218. As such, in response to a mobile payment via the mobile wallet client application 218, the mobile wallet client application 218 causes the banking client application 214 to update the payment account (i.e., the account that supported the mobile payment). As such, the applications 214 and 218 are communicably coupled to each other to enable actions supported by each respective application.

The mobile wallet client application 218 is communicably coupled to the provider institution computing system 230 (e.g., the mobile wallet database 242) via the communication network 120 and is structured to facilitate purchases by the user 101 via the mobile wallet client application 218. Accordingly, the mobile wallet client application 218 is linked or otherwise connected with one or more accounts (as stored in the account database 240) of the user 101. In operation, when at a point-of-sale terminal, the user 101 initiates the mobile wallet client application 218 and provides a passcode (e.g., biometrics such as a thumbprint, a Personal Identification Number (PIN), a password) to authenticate the user 101 and select the source payment account desired (e.g., a checking account from the provider institution 140 that is linked to the mobile wallet client application 218). Via communication with the payment terminal (e.g., via near field communication), the aforementioned payment information is provided to the POS terminal or the merchant (e.g., via NFC, via barcode presentment) and the payment is processed. Beneficially, carrying payment cards are avoided or reduced via the mobile wallet client application 218.

As mentioned herein, the mobile wallet client application 218 is structured to facilitate and permit payments by interfacing with an account held by the user 101 at the provider institution 140. Accordingly, the mobile wallet client application 218 is communicably coupled via the network interface 208 over the communication network 120 to the provider institution computing system 230. As shown, the mobile wallet client application 218 includes a payment processing circuit 220 structured to facilitate payments by the user 101 via the mobile wallet client application 218. For example, the payment processing circuit 216 enables a quick-pay capability with a merchant. In this regard, the payment processing circuit 216 includes or is communicably coupled with a communication device (e.g., a near-field communication chip) that facilitates the exchange of information between the mobile wallet client application 218 and a POS terminal.

Figure 3:
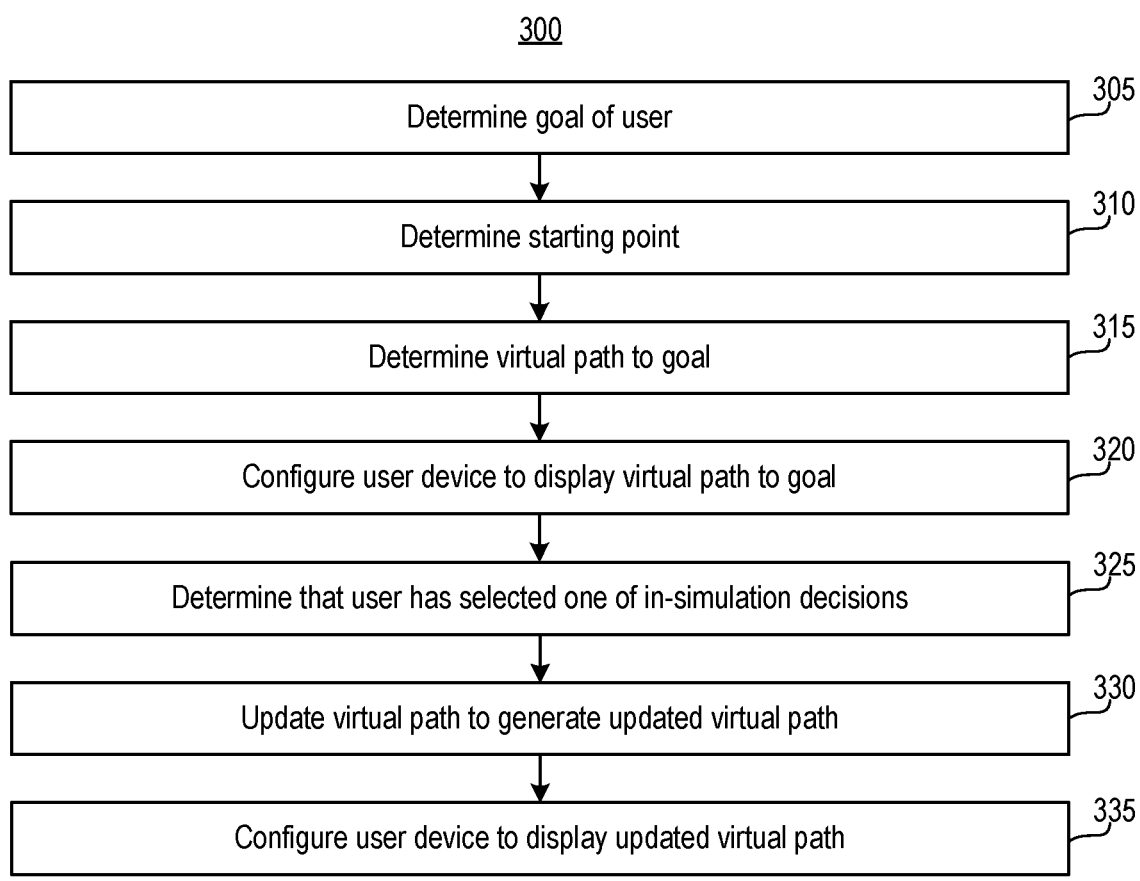
FIG. 3 is a flow diagram illustrating a method for providing an interactive computer simulation according to some arrangements.

FIG. 3 is a flow diagram illustrating a method 300 for providing an interactive computer simulation according to various arrangements. In some implementations, method 300 can be executed using the backend simulation circuit of the provider institution computing system 230. For example, and referring to FIGS. 1-3, the provider institution computing system 230 (e.g., the backend simulation circuit 244) is configured to gather data used in generating the interactive computer simulation of a life of the user 101, causes the user device 110 to graphically depict a virtual path (e.g., a simulated life path) in the interactive computer simulation based on in-simulation decisions (e.g., simulated financial decisions) of the user 101, and tracks actual decisions of the user 101 to compare the actual decisions with the in-simulation decisions.

At 305, the goal 105 of the user 101 is determined. In some examples, the goal 105 can be explicitly defined by the user 101. The user 101 can define the goal 105 using the input circuit 210 of the user device 110, for example, while playing the interactive computer simulation. In some implementations, an output circuit (e.g., output circuit 212) is configured to output a prompt (e.g., a question) requesting the user 101 to input the goal 105. In some examples, the user 101 can define the goal 105 in the course of using an application (e.g., the banking client application 214, the mobile wallet client application 218, or another suitable application that is not the interactive computer simulation application) signing up for products or services offered by the provider institution 140. For example, while inputting information when applying for a checking account, mortgage, or other products or services, the user 101 can answer, via an input circuit (e.g., input circuit 210), questions presented via the output circuit 212 related to the goal 105. In some implementations, the simulation circuit 222 sends the user input received via the input circuit 210 to the backend simulation circuit 244. In that regard, the backend simulation circuit 244 receives the goal 105 from the user device 110.

In some arrangements, an output circuit (e.g., output circuit 212) is configured by a simulation circuit (e.g., simulation circuit 222) to output user interactive elements corresponding to one or more recommended goals selectable by the user 101 via an input circuit (e.g., input circuit 210). In that regard, the user 101 may not need to explicitly define the goal 105.

In some examples, the one or more recommended goals may be crowd-sourced from other users (e.g., those who use the interactive simulation platform provided by the provider institution computing system 230). For example, the backend simulation circuit 244 is configured to search the goal database 248 using identification information of the user 101 as search criteria to identify goals of other users having the same or similar background (e.g., similar identification information) as that of the user 101. The goals of other users can be defined via any suitable method described herein. Those goals can be recommended to the user 101. In some example, a group of users having a similar background as the user 101 can be identified. A predetermined number (e.g., 3, 5, or 10) of the goals appearing to have the highest frequency among the group of users are presented as recommended goals selectable by the user 101. The backend simulation circuit 244 sends the recommended goals to the user device 110 (e.g., to the simulation circuit 222) and receives selection of at least one of the recommended goals from the user device 110.

In some examples, a backend simulation circuit (e.g., backend simulation circuit 244) is configured to recommend at least one goal based on the account information stored in one or more of the account database 240, the mobile wallet database 242, the account information database 145, the account information database of one or more other provider institution databases, and the like. In some examples, the backend simulation circuit 244 can identify life-events of the user 101. The goal 105 can be automatically defined to correspond to the life-events. For instance, the backend simulation circuit 244 can scan transaction history stored in the databases and can detect that the customer 101 has begun purchasing baby supplies and paying for visits to an obstetrician-gynecologist. Based on this information, the backend simulation circuit 244 can be configured to determine that the user 101 is expecting a child, which is a detected life-event. The backend simulation circuit 244 automatically sets the goal 105 to be one or more of purchasing a three-bedroom home in five years in an area with a decent school district, accumulating $50,000 in savings in eighteen years for establishing a college fund, and purchasing a minivan in ten months. A monetary value associated with the goal 105 can be determined based on context information in the manner described.

At 310, a backend simulation circuit (e.g., backend simulation circuit 244) is configured to determine a starting point for the interactive computer simulation. The starting point may correspond to a current status (e.g., a current financial status) of the user 101. Example attributes defining the starting point include but are not limited to, a total net worth, asset values, asset types (e.g., real property, tangible property, intangible property, and the like), debt values, debt types (e.g., mortgage, loans, and the like), income (e.g., wage), and the like. In some arrangements, the backend simulation circuit 244 can be configured to determine the starting point based on at least one of user input, information imported from a third-party software or website, and transaction history of the user. For instance, the input circuit 210 of the user device 110 can be configured to receive user input related to the starting point. The simulation circuit 222 sends the user input corresponding to the starting point received via the input circuit 210 to the backend simulation circuit 244. Furthermore, the backend simulation circuit 244 can connect to and crawl through a third-party software or website, such as but not limited to, a social media account/website of the user 101, to determine the current status of the user 101. For example, responsive to the backend simulation circuit 244 recognizing (via photo recognition) that the user 101 has posted a photo of a home and an automobile of the user 101, the backend simulation circuit 244 can be configured to determine that the user 101 owns the home and the automobile. Still further, the backend simulation circuit 244 can access the account information database 145 to determine the current status of the user 101.

At 315, a backend simulation circuit (e.g., backend simulation circuit 244) is configured to determine a virtual path to the goal 105. At 320, a backend simulation circuit (e.g., backend simulation circuit 244) configures the user device 110 (e.g., via the output circuit 212) to display the virtual path. For example, the backend simulation circuit 244 sends the instructions, codes, objects, data, and other information to the simulation circuit 222, where the simulation circuit 222 configures the output circuit 222 with the instructions, codes, objects, data, and other information to display the virtual path. The virtual path includes selectable in-simulation decisions configured to be selected by the user 101 via the user device 110. In that regard, the virtual path and the selectable in-simulation decisions can be displayed or otherwise presented as selectable user interactive elements. The virtual path and the selectable in-simulation decisions that define the virtual path represent trade-off and opportunity cost in financial decision making.

The selectable in-simulation decisions can be financial decisions, life decisions, and the like. Examples of the selectable in-simulation decisions include but are not limited to, to become employed at a certain company or in a certain career, to become unemployed, to become self-employed, to take certain loans under varying terms and conditions, to refinance existing loans or other financial obligations, to purchase or fund varying types of investments, to obtain credit cards or other credit sources with varying terms and conditions, to take a vacation for a certain number of days, to purchase certain goods/services, to save, to gift, to attend college, to become married, to have one or more children, and the like.

In some examples, the selectable in-simulation decisions are populated by the user 101 via the user input circuit 210. In other words, the user 101 can define the selectable in-simulation decisions that link the starting point to the goal 105. In that regard, the backend simulation circuit 244 sends a goal template (with fields or blanks to be populated by the user 101) to the user device 110, such that the user 101 can define the selectable in-simulation decisions via the input circuit 210. The user-defined selectable in-simulation decisions can be sent to the goal database 248 to be stored.

In some examples, the selectable in-simulation decisions can be determined based on predetermined templates of selectable in-simulation decisions corresponding to respective goals. The predetermined templates are stored in the goal database 248. The backend simulation circuit 244 selects one or more predetermined templates that correspond to the defined goal 105. For example, responsive to the backend simulation circuit 244 defining the goal 105, the backend simulation circuit 244 searches the goal database 248 for predetermined templates corresponding to the goal 105. Responsive to determining that at least one predetermined template corresponding to the goal 105 exist, the at least one predetermined template can be sent to the user device 110.

In some examples, the selectable in-simulation decisions may be crowd-sourced from other users (e.g., those who use the interactive simulation platform provided by the provider institution computing system 230). For example, the backend simulation circuit 244 is configured to search the goal database 248 using identification information of the user 101 as search criteria to identify virtual paths (including one or more of selectable in-simulation decisions, selected in-simulation decisions, and actual decisions) of other users having the same or similar background (e.g., similar identification information) as that of the user 101. One or more of the selectable in-simulation decisions, selected in-simulation decisions, and actual decisions of other users associated with respective goals can be set as the selectable in-simulation decisions for the current interactive computer simulation for the user 101. In some example, a group of users having a similar background as the user 101 and having the same goal 105 as the user 101 can be identified by the backend simulation circuit 244. The virtual paths (including one or more of selectable in-simulation decisions, selected in-simulation decisions, and actual decisions) of other users can be sent by the backend simulation circuit 244 to the user device 110 (e.g., to the simulation circuit 222) as the selectable in-simulation decisions (e.g., a virtual path) to reach the goal 105.

In some arrangements, the backend simulation circuit 244 can be configured to determine the selectable in-simulation decisions based on the nature or characteristics of the goal 105. In general, the selectable in-simulation decisions define steps required to be met by the user 101 to reach the goal 105. In some examples, the selectable in-simulation decisions define milestones achievable by the user 101. The selectable in-simulation decisions may be distributed throughout a time interval, where the goal 105 is expected to be achieved at the end of the time interval. In other words, the end of the time interval corresponds to a desired realization time. The desired realization time can be received from the user 101 via the input circuit 210 and sent to the backend simulation circuit 244.

In some arrangements, the selectable in-simulation decisions can be defined based on the realization time. In one example in which the goal 105 is to attain saving of a given amount (e.g., $1,000,000) at a given desired realization time (e.g., in 5 years), the selectable in-simulation decisions can include portions (e.g., portions of $200,000) of the given amount of every unit of time (e.g., every year) leading up to the desired realization time. Examples of the units of time include, but are not limited to, hours, days, weeks, months, and years. In some arrangements, in which the goal 105 is not associated with a particular monetary amount, the context information as well as other information can be used to assign a monetary amount in the manner described. The selectable in-simulation decisions can then be determined based on the assigned monetary amount.

The selectable in-simulation decisions for the instant interactive computer simulation for the goal 105 can be determined using any combination of the methods disclosed herein.

At 325, the backend simulation circuit 244 is configured to determine that the user has selected at least one of the selectable in-simulation decisions. For example, the user 101 can select one or more of the selectable in-simulation decisions that are presented as user interactive elements via the input circuit 210. The selected one or more selectable in-simulation decisions can be sent to the backend simulation circuit 244 and stored in the simulation database 250.

At 330, the backend simulation circuit 244 is configured to update the virtual path to generate an updated virtual path to the goal 105. For example, the backend simulation circuit 244 updates the instructions, codes, objects, data, and other information for the interactive computer simulation based on the user selection. At 335, the backend simulation circuit 244 configures the user device 110 (e.g., the output circuit 212) to display the updated virtual path. For example, the backend simulation circuit 244 sends the instructions, codes, objects, data, and other information to the simulation circuit 222, where the simulation circuit 222 configures the output circuit 222 with the instructions, codes, objects, data, and other information to display the updated virtual path.

As described, virtual path and the selectable in-simulation decisions that define the virtual path represent trade-off and opportunity cost in financial decision making. As the user 101 selects some of the selectable in-simulation decisions, other selectable in-simulation decisions can be generated (and appear graphically) or removed (and disappear graphically) corresponding to the consequences of the selected in-simulation decisions. Therefore, the selectable in-simulation decisions can be 'played' by the user 101 such that the user 101 can see what decisions need to be made and in what manner to reach the goal 105. As such, the selectable in-simulation decisions can change as the user 101 progresses through the game.

In some examples, the backend simulation circuit 244 is configured to determine that the user 101 has selected at least one of the selectable in-simulation decisions by tracking the actual decisions made by the user 101. By tracking the account information of the user 101, for example, as stored in the account information database 145, the backend simulation circuit 244 can be configured to determine that the user 101 had made a financial decision or a life decision. For example, the backend simulation circuit 244 can filter the account information of the user 101 to determine that the user had made certain purchases, investments debts, and the like. The backend simulation circuit 244 can infer a life event or decision (e.g., having a child) based on the account information in the manner described. The backend simulation circuit 244 can check the account information database 145 periodically (e.g., every 30 minutes, every hour, every day, every week, and the like). In some examples, the backend simulation circuit 244 can check the account information database 145 every time the user 101 turns on the interactive computer simulation.

Whereas none of the actual decisions (e.g., financial decisions or life decisions) detected by the backend simulation circuit 244 corresponds to any of the selectable in-simulation decisions, the backend simulation circuit 244 may continue tracking the actual decisions made by the user 101 by checking the account information database 145. On the other hand, responsive to the backend simulation circuit 244 determining that an actual decision (e.g., a financial decision or a life decision) corresponds to one of the selectable in-simulation decisions, that selectable in-simulation decisions is deem selected.

For example, responsive to the backend simulation circuit 244 determining that the user 101 has saved an amount of money (e.g., $1000) into a financial account of the user 101, the backend simulation circuit 244 can be configured to determine that the actual decision of saving the amount of money corresponds to a selectable in-simulation decision of "saving at least a threshold amount (e.g., $800)." That selectable in-simulation decision can be deemed selected without any explicit user input. In that regard, the updated virtual path can generated based on the actual decision of the user 101, based on explicit user selection within the context of the interactive computer simulation, or based on a combination thereof (e.g., some of the selectable in-simulation decisions can be selected based on user input within the context of the interactive computer simulation while other table in-simulation decisions can be selected based on the actual decision of the user 101).

In some arrangements, an in-simulation decision can be converted into an actual decision (e.g., to purchase goods or services. For example, the user device 110 and can be connected to, for example, online merchants, third-party merchant applications, virtual banking (e.g., provided by the provider institution computing system 230), or online banking (e.g., provided by the provider institution computing system 230), such that in-simulation decisions can be completed as actual decisions or actions in real life. In some examples, the user 101 can trigger the actuation of an in-simulation decision by selecting a suitable user interactive element corresponding to enabling the actuation. In other examples, the simulation circuit 222 or the backend simulation circuit 244 automatically actuates the in-simulation without user input.

For example, responsive to determining that the user 101 has selected a selectable in-simulation decision corresponding to purchasing a product or service, one or more of the banking client application 214, the mobile wallet client application 218, the simulation circuit 222, the backend simulation circuit 244 can be configured to identify an online merchant or a third-party merchant application using the product/service name, dealer name, store name, application name, or the like that offers the product or service. The one or more of the banking client application 214, the mobile wallet client application 218, the simulation circuit 222, the backend simulation circuit 244 can be configured to place a purchase for the product or service on behalf of the user 101.

The user 101 can replay the same scenario or same simulation/game (e.g., from the same starting point to the same goal 105) multiple times, selecting multiple different virtual paths and different in-simulation decisions, for example, to see how the decisions can play out. That is, the interactive computer simulation can assist the user 101 in determining which decisions can achieve a better outcome. In that regard, multiple parallel virtual paths can be generated. For example, from the starting point, the virtual path can be updated multiple times for different plays to generate a plurality of parallel updated virtual paths. The parallel updated virtual paths refer to different virtual paths (each having at least one different selected in-simulation decision as compared to others) that connect the starting point and the goal 105. The parallel updated virtual paths can be saved by the backend simulation circuit 244 to a suitable database (e.g., the simulation database 250).

In some arrangements, upon user request, the backend simulation circuit 244 can send the parallel updated virtual paths to the user device 110 to be displayed by the output circuit 212. The user 101 can select, via the input circuit 210, one of the parallel updated virtual paths, where such selection is sent to and received by the backend simulation circuit 244. The backend simulation circuit 244 can be configured to load the selected parallel updated virtual path and track the actual decisions of the user 101 by comparing the actual decisions of the user 101 with the selected in-simulation decisions. As such, the backend simulation circuit 244 can be configured to compare the actual decisions of the user 101 against previously made in-simulation decisions of the selected one of the parallel updated virtual paths.

Figure 4:
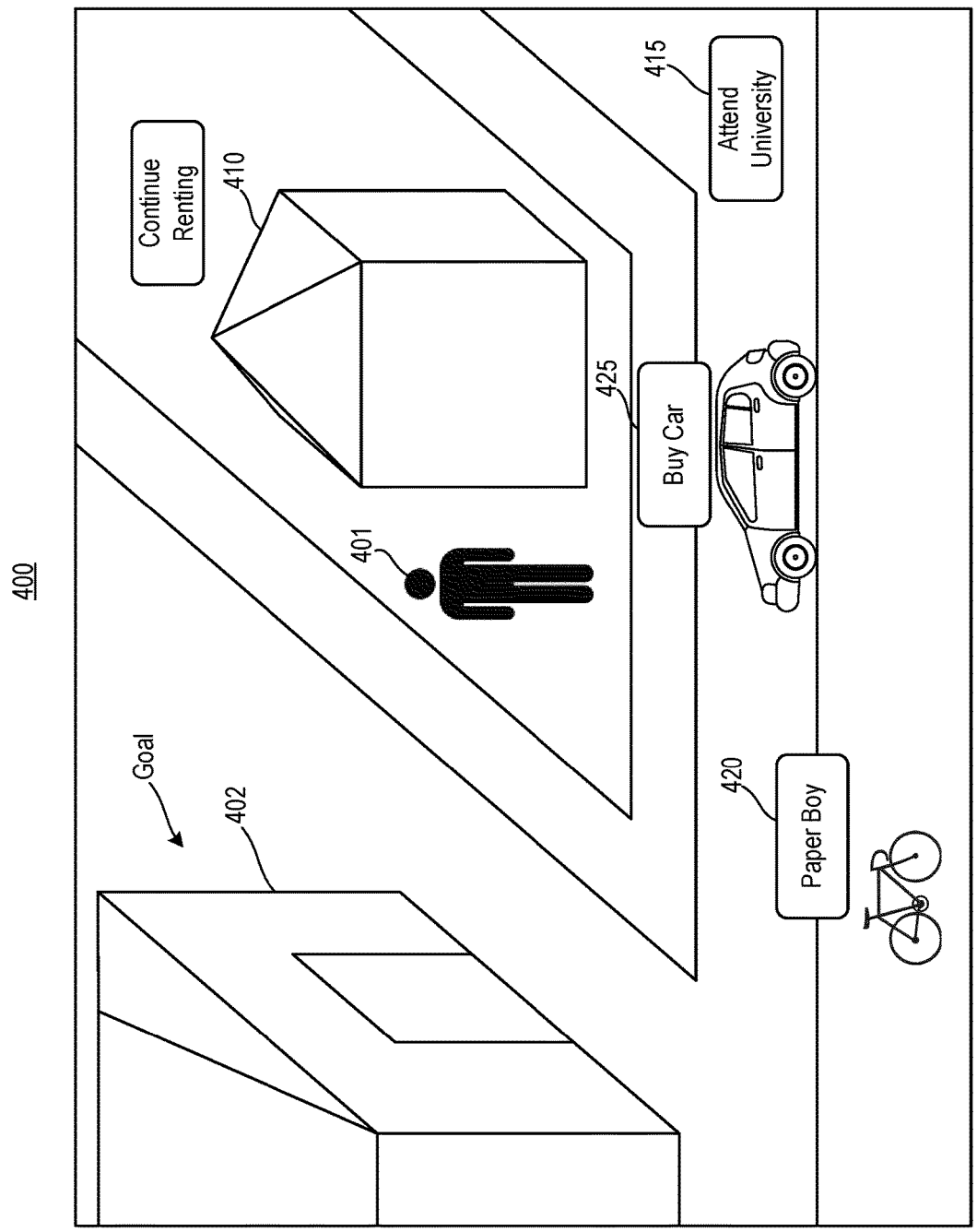
FIG. 4 is an interface display diagram illustrating a display interface showing a 2D representation of the interactive computer simulation according to some arrangements.

FIG. 4 is an interface display diagram illustrating a display interface 400 showing a 2D representation of the interactive computer simulation according to some arrangements. Referring to FIGS. 1-4, the display interface 400 can be displayed using the output circuit 212. The display interface 400 corresponds to the virtual path described with respect to block 320. As shown, the virtual path can be displayed as user interactive elements corresponding to the selectable in-simulation decisions. User selection of one of the user interactive elements causes another one of the user interactive elements (currently displayed) to disappear and/or causes a new user interactive element (corresponding to a new selectable in-simulation decision) to appear.

The display interface 400 can show varying levels of details, including high-definition depictions of objects shown, or low-definition (pixelated) depictions of objects shown. In some arrangements, the user 101 can select a level of detail or a level of definition presented by the display interface 400. The user 101 can be represented by an avatar 401, which can be configured to move around in various display interfaces provided by the interactive computer simulation, including the display interface 400. The display interface 400 corresponds to the starting point of the interactive simulation. The display interface 400 shows the goal 105, which corresponds to purchasing a new home 402. The graphical state (e.g., color, border, size, style, and the like) of the goal 105 (e.g., the new home 402) may change as the user 101 is selecting in-simulation decisions that moves closer to achieving the goal 105 and as the user 101 is selecting in-simulation decisions that moves farther away from achieving the goal 105.

As shown, the display interface 400 shows user interactive elements corresponding to various in-simulation decisions selectable by the user 101. For example, the display interface 400 shows a selectable in-simulation decision (a selectable user interactive element) corresponding to continuing to rent a current home 410. The current home 410 may be an actual home of the user 101 and may appear like the actual home of the user. For instance, the backend simulation circuit 244 may identify pictures or videos of the home from websites or social media accounts of the user 101 and generate a depiction (e.g., the current home 410) of the actual home.

The display interface 400 shows a selectable in-simulation decision (a selectable user interactive element) corresponding to starting a new job (e.g., being a paper boy 420), a selectable in-simulation decision (a selectable user interactive element) corresponding to attending university 415, and selectable in-simulation decision (a selectable user interactive element) corresponding to purchasing a new car 425.

In one example, selecting purchasing a new car 425 can cause attending university 415 to disappear from the display interface 400 given that the user 101 (the avatar 401) would not have any savings to attend the university. Selecting purchasing a new car 425 can cause new user interactive element corresponding to new selectable in-simulation decisions (e.g., go on a road trip) to appear. In one example, selecting attending university 415 can cause the interactive computer simulation to display another display interface corresponding to the contexts related to the selection by displaying one or more of a classroom, a dormitory, a cafeteria, and the like.

Given that a temporal component is associated with each selectable in-simulation decision, the passing of time can be illustrated. For example, responsive to the user 101 selecting attending university 415, a subsequent display interface can show the avatar 401 aged a number of years (e.g., 4 years) corresponding to the time it typically takes to attend a university. The user 101 can select to play the interactive computer simulation in real-time or in accelerated time via suitable user interactive elements.

The display interface 400 can be further displayed as a 3D interface using suitable AR and VR devices, such that the user 101 can control a point of view for viewing the display interface.

Figure 5:
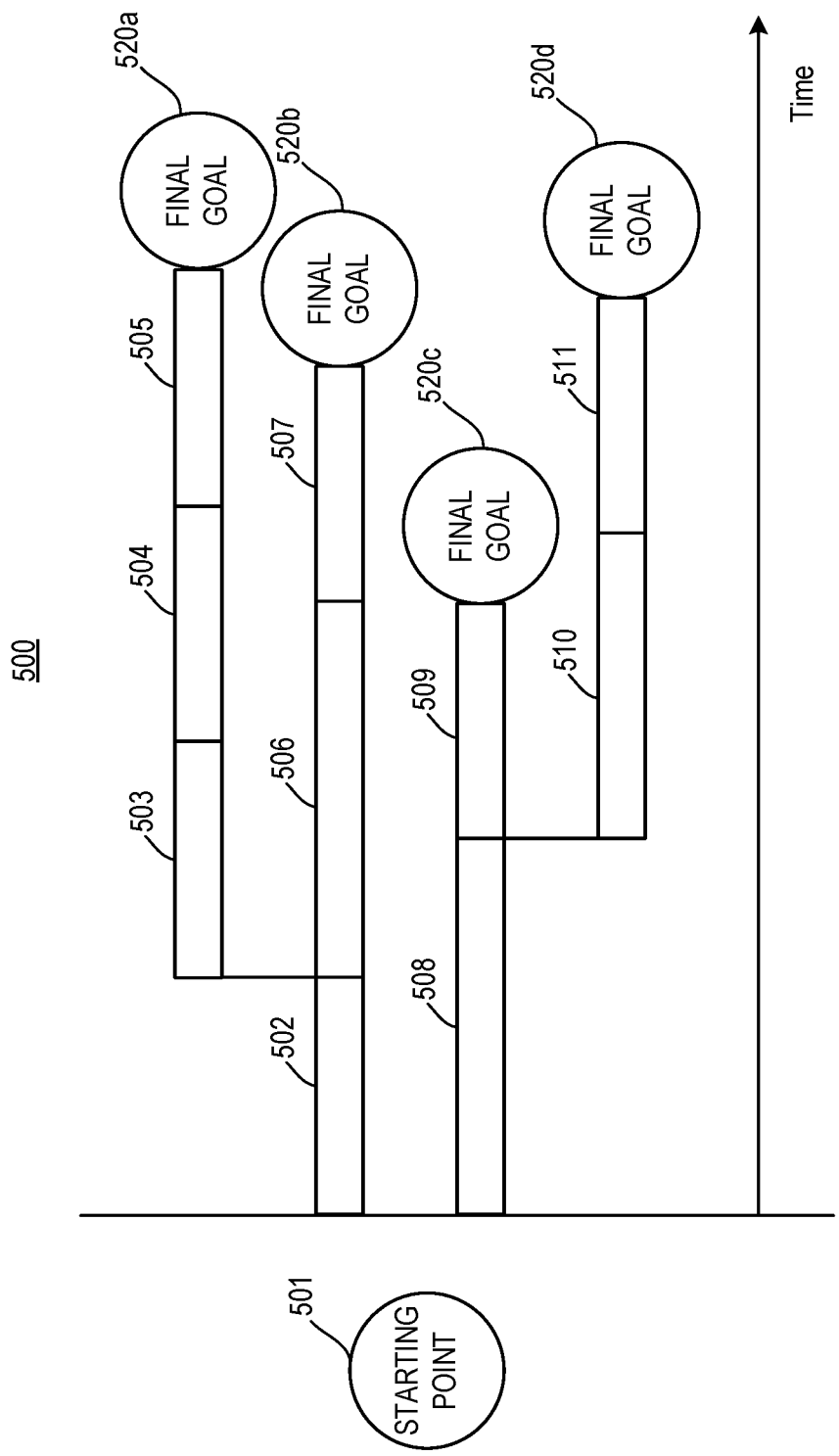
FIG. 5 is an interface display diagram illustrating a display interface showing a timeline representation of the interactive computer simulation according to some arrangements.

FIG. 5 is an interface display diagram illustrating a display interface 500 showing a timeline representation of the interactive computer simulation according to some arrangements. Referring to FIGS. 1-5, the display interface 500 can be displayed using the output circuit 212. The display interface 500 corresponds to the virtual path described with respect to block 320. As shown, the virtual path can be displayed as user interactive elements corresponding to the selectable in-simulation decisions, in a timeline format. User selection of one of the user interactive elements causes another one of the user interactive elements (currently displayed) to disappear and/or causes a new user interactive element (corresponding to a new selectable in-simulation decision) to appear.

The display interface 500 shows a starting point 501, which is determine at block 310. The display interface 500 shows user interactive elements 502-511, each corresponds to a different selectable in-simulation decision. Each of the user interactive elements 502-511 may have an associated duration of completion, represented by different lengths as shown. In other words, each of the user interactive elements 502-511 has a length corresponding to an estimated or average amount of time associated with executing an associated selectable in-simulation decisions in real life. Goal elements 520a-520d represent the same goal 105 but achieved at different times from the starting point 510, due to different selections made by the user 101.

The user interactive elements 502-505, in that order, represent a first branch of the virtual path to achieving the goal 105 (at a time corresponding to the goal element 520a). The user interactive elements 502, 506, and 507, in that order, represent a second branch of the virtual path to achieving the goal 105 (at a time corresponding to the goal element 520b). The user interactive elements 508 and 509, in that order, represent a third branch of the virtual path to achieving the goal 105 (at a time corresponding to the goal element 520c). The user interactive elements 508, 510, and 511, in that order, represent a fourth branch of the virtual path to achieving the goal 105 (at a time corresponding to the goal element 520d). The first and second branches share the user interactive element 502. The third and fourth branches share the user interactive element 508.

Selecting the user interactive element 502 can cause the user interactive elements 508-511 and goal elements 520c and 520d to disappear from the display interface 500. Subsequently, selecting user interactive element 503 can cause the user interactive elements 506 and 507 and goal element 520b to disappear from the display interface 500. In some examples, selecting one of the user interactive elements 502-511 can cause new branches and user interactive elements associated thereof to appear in the display interface 500.

Figure 6A:
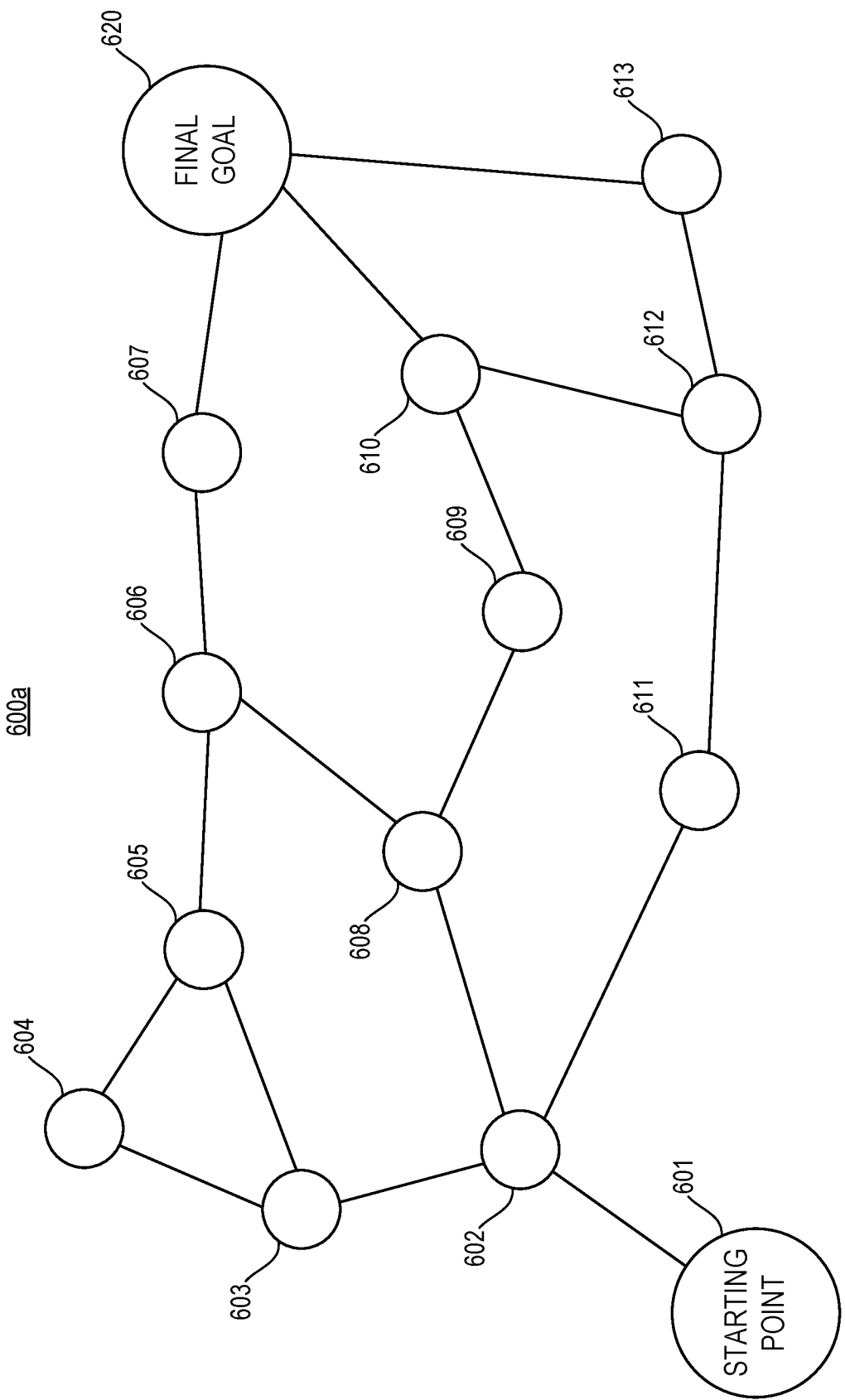
FIG. 6A is an interface display diagram illustrating a display interface showing a node representation of the interactive computer simulation according to some arrangements.
Figure 6B:
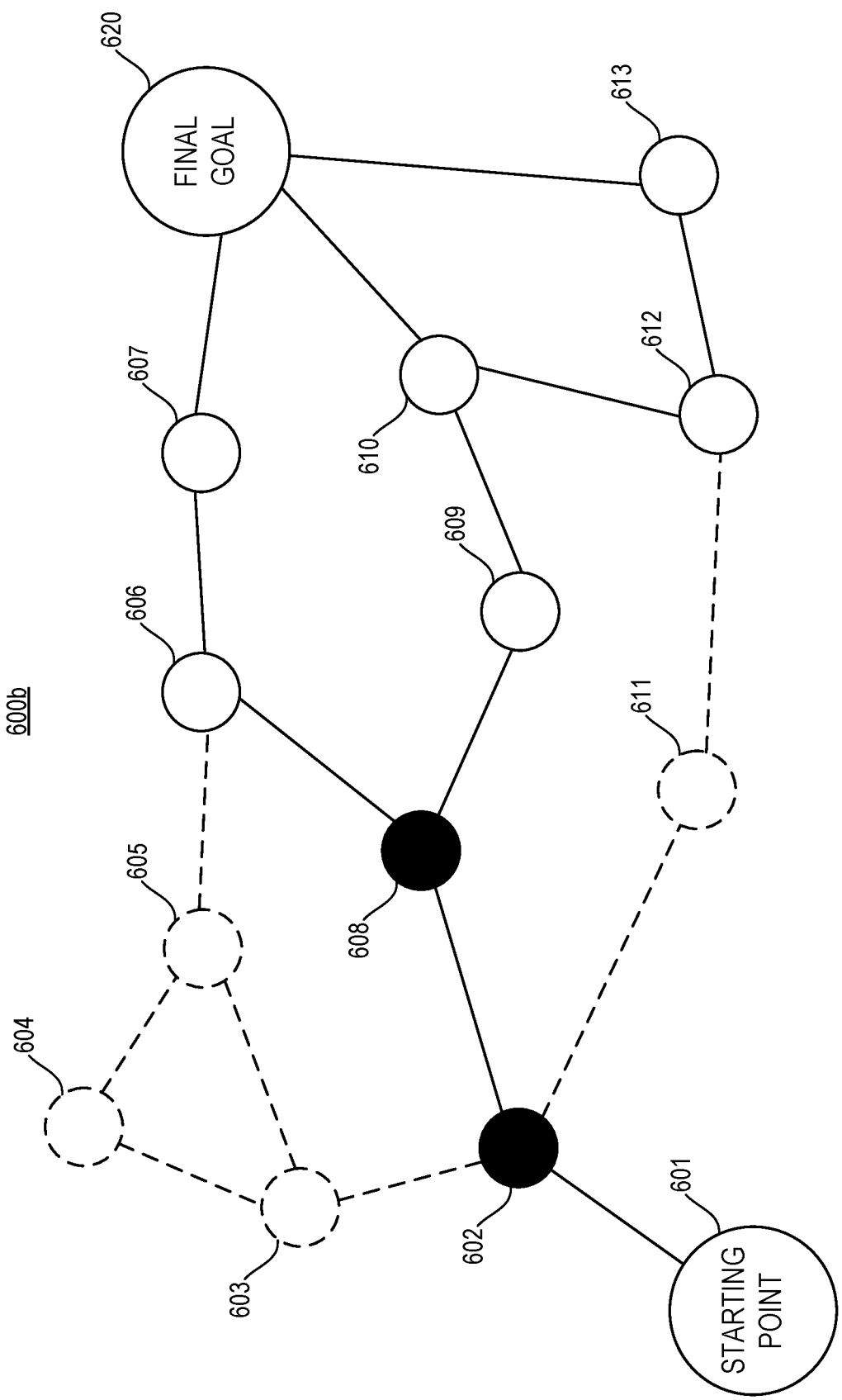
FIG. 6B is an interface display diagram illustrating a display interface showing a node representation of the interactive computer simulation according to some arrangements.
Figure 6C:
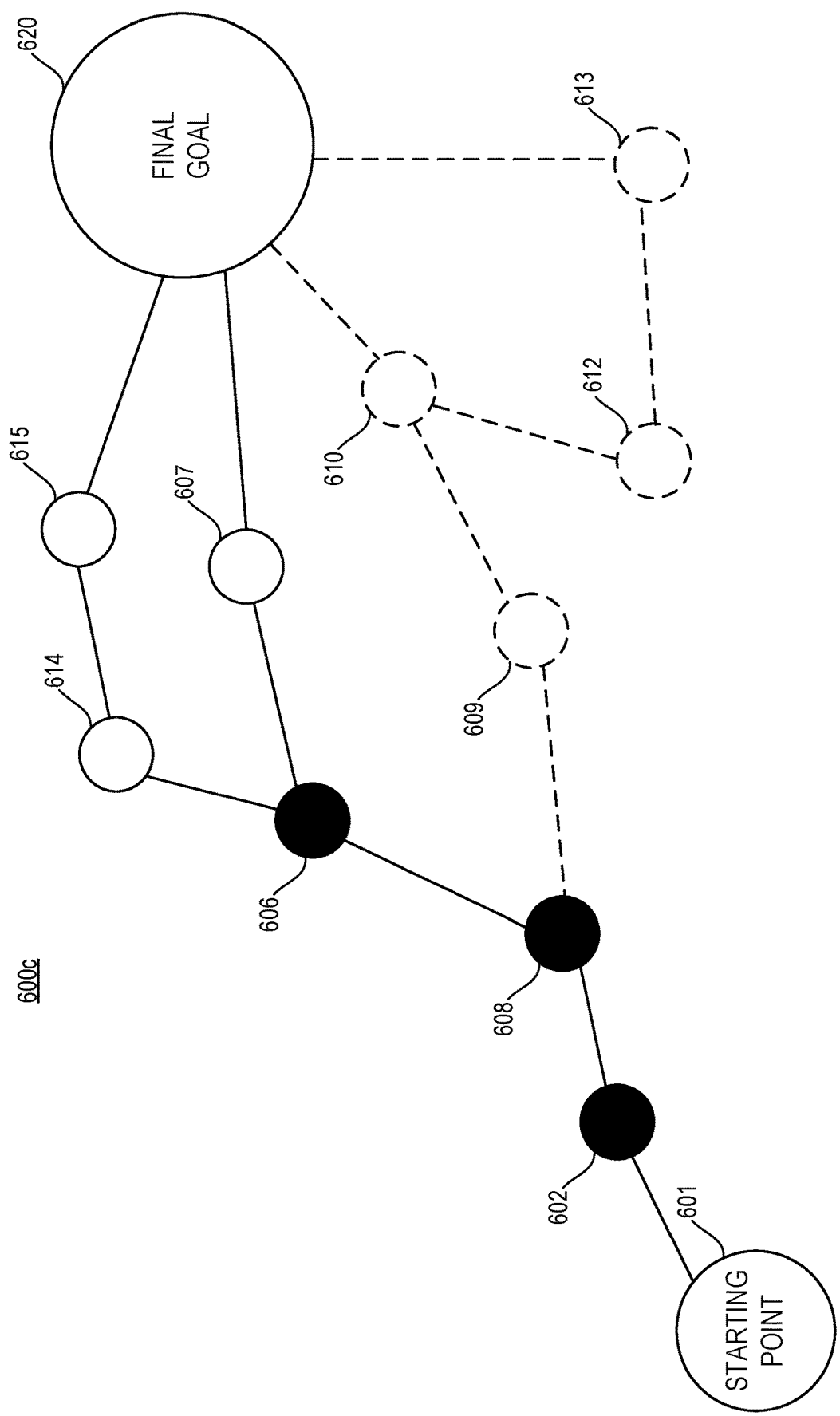
FIG. 6C is an interface display diagram illustrating a display interface showing a node representation of the interactive computer simulation according to some arrangements.

FIG. 6A is an interface display diagram illustrating a display interface 600a showing a node representation of the interactive computer simulation according to some arrangements. FIG. 6B is an interface display diagram illustrating a display interface 600b showing a node representation of the interactive computer simulation according to some arrangements. FIG. 6C is an interface display diagram illustrating a display interface 600c showing a node representation of the interactive computer simulation according to some arrangements. Referring to FIGS. 1-6C, the display interfaces 600a-600c can be displayed using the output circuit 212.

The display interface 600a corresponds to the virtual path described with respect to block 320. The display interfaces 600b and 600c correspond to the updated virtual path described with respect to block 335. As shown, the virtual path and the updated virtual paths can be displayed as interconnecting node elements 602-615 corresponding to the selectable in-simulation decisions. User selection of one of the nodes causes one or more other nodes (currently displayed) to disappear and/or causes one or more new nodes (corresponding to a new selectable in-simulation decision) to appear.

Each of the nodes are objects with underlying measurements/parameters that affect the manner in which the user 101 can reach the final goal 620 (105), which is a display element. The parameters correspond to the information of the in-simulation decisions that can be defined via any suitable manner described herein. While the display interfaces 600a-600c are 2D depictions, the node implementation can be 3D, with the final goal 620 in the middle of a web of interconnection nodes, each representing a possible in-simulation decision.

The display interface 600a corresponds to the virtual path described with respect to block 320. The virtual path connects the starting point 601 to the final goal 602 with interconnecting nodes 602-613. The user 101 can select any of the nodes 602-613 to select a corresponding in-simulation decision.

The display interface 600b corresponds to the updated virtual path described with respect to block 335. In particular, the display interface 600b is displayed responsive to user selection of nodes 602 and 608. As show, the selection of the nodes 602 and 608 causes the nodes 603-605 and 611 to be no long relevant for reaching the final goal 620. Thus, the nodes 603-605 and 611 can be displayed in a de-emphasized state (e.g., dashed out, faded, become smaller, or the like).

The display interface 600c corresponds to the updated virtual path described with respect to block 335. In particular, the display interface 600c is displayed responsive to user selection of node 606. As show, the selection of the node 606 causes the nodes 609, 610, 612, and 613 to be no long relevant for reaching the final goal 620. Thus, the nodes 609, 610, 612, and 613 can be displayed in a de-emphasized state (e.g., dashed out, faded, become smaller, or the like). Furthermore, new nodes corresponding to new in-simulation decisions 614 and 615 can be generated to be selectable by the user 101. The display element corresponding to the final goal 620 is graphically emphasized or de-emphasized based on user selection of the nodes 602-613. For example, as the user 101 is moving closer to the final goal 620, the final goal 620 may become emphasized (e.g., becomes bigger) to show the user 101 that the user 101 is moving in a positive direction toward the goal. On the other hand, responsive to determining that the user 101 is moving away from achieving the final goal 620, the final goal 620 becomes de-emphasized (e.g., dashed out, faded, become smaller, or the like).

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the arrangements might include a general purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method of simulating financial decisions, comprising:
   providing an interactive computer simulation of a life of a user via a user device operated by the user, wherein providing the interactive computer simulation comprises:
   determining, by a provider computing system, a financial goal of the user;
   accessing, by the provider computing system, a financial transaction history of the user;
   determining, by the provider computing system, an initial financial state of the user based on the financial transaction history of the user;
   determining, by the provider computing system, a virtual path to the financial goal, wherein the initial financial state of the user is a starting point of the virtual path to the financial goal;
   configuring, by the provider computing system, the user device to display the virtual path to the financial goal, wherein the virtual path comprises the starting point of the virtual path to the financial goal and a plurality of interactive elements corresponding to a plurality of selectable in-simulation financial decisions configured to be selected by the user via the user device;
   determining, by the provider computing system, that the user has selected at least one of the plurality of selectable in-simulation financial decisions;
   updating, by the provider computing system, the virtual path to generate a first updated virtual path based on the selected at least one of the plurality of selectable in-simulation financial decisions, the first updated virtual path comprising a first updated plurality of interactive elements displayed on the user device and corresponding to a first updated plurality of selectable in-simulation financial decisions;
   configuring, by the provider computing system, the user device to display the first updated virtual path;
   determining, by the provider computing system, that the user has returned to the starting point of the virtual path and selected an additional one of the plurality of selectable in-simulation financial decisions, the additional one of the plurality of selectable in-simulation financial decisions being different than the at least one of the plurality of selectable in-simulation financial decisions;
   updating, by the provider computing system, the virtual path to generate a second updated virtual path based on the selected additional one of the plurality of selectable in-simulation financial decisions; and
   configuring, by the provider computing system, the user device to display the second updated virtual path;
   wherein each of the plurality of interactive elements has a length corresponding to an estimated amount of time associated with executing an associated one of the plurality of selectable in-simulation financial decisions in real life.

2. The method of claim 1, wherein the initial financial state of the user corresponds to a current status of the user.

3. The method of claim 2, wherein the initial financial state is determined further based on at least one of user input and information imported from a third-party software or website.

4. The method of claim 1, wherein
   determining the financial goal of the user comprises receiving, by the provider computing system from the user device, the financial goal; and
   the financial goal is defined via an input circuit of the user device.

5. The method of claim 1, wherein determining the financial goal of the user comprises:
   identifying recommended financial goals defined by other users;
   sending the recommended financial goals to the user device; and
   receiving a selection of at least one of the recommended financial goals from the user device.

6. The method of claim 1, wherein determining the financial goal of the user comprises:
   determining at least one recommended financial goal based on account information of the user;
   sending one or more of the at least one recommended financial goal to the user device; and
   receiving a selection of one or more of the at least one recommended financial goal from the user device.

7. The method of claim 1, wherein the plurality of selectable in-simulation decisions are defined by the user via an input circuit of the user device.

8. The method of claim 1, wherein determining the virtual path to the financial goal comprises selecting one or more predetermined templates of the selectable in-simulation financial decisions that correspond to the financial goal, wherein the predetermined templates are stored in a database of the provider computing system.

9. The method of claim 1, wherein determining the virtual path to the financial goal comprises;
   searching a database of the provider computing system for one or more of selectable in-simulation financial decisions defined by other users, selected in-simulation financial decisions selected by the other users, or actual financial decisions of other users; and
   setting the one or more of the selectable in-simulation financial decisions defined by the other users, the selected in-simulation financial decisions selected by the other users, or the actual financial decisions of other users as the plurality of selectable in-simulation financial decisions.

10. The method of claim 1, wherein providing the interactive computer simulation further comprises:
    tracking an actual financial decision of the user; and
    determining that the actual financial decision corresponds to one of the plurality of selectable in-simulation financial decisions, wherein determining that the user has selected at least one of the plurality of selectable in-simulation financial decisions comprises selecting the one of the plurality of selectable in-simulation financial decisions.

11. The method of claim 10, wherein the first updated virtual path is generated based on the actual financial decision of the user.

12. The method of claim 1, wherein updating the virtual path to generate the first updated virtual path comprises:
    updating the virtual path to generate a plurality of parallel updated virtual paths; and
    saving the plurality of parallel updated virtual paths.

13. The method of claim 12, wherein providing the interactive computer simulation further comprises:
    receiving user selection of one of the plurality of parallel updated virtual paths from the user device;

loading the selected one of the plurality of parallel updated virtual paths;
tracking actual financial decisions of the user; and
comparing the actual financial decisions against previously made in-simulation financial decisions of the selected one of the plurality of parallel updated virtual paths.

14. The method of claim 1, further comprising:
determining that the selected at least one of the plurality of in-simulation financial decisions corresponds to purchasing a product or service;
identifying an online merchant or a third-party merchant application offering the product or the service; and
placing a purchase for the product or the service.

15. The method of claim 1, wherein
user selection of a first user interactive element of the plurality of interactive elements causes a second user interactive element of the plurality of interactive elements to disappear and causes a third user interactive element to appear.

16. The method of claim 1, wherein the virtual path is displayed as interconnecting nodes representing the plurality of selectable in-simulation financial decisions, each of the nodes comprises parameters that define an associated one of the plurality of selectable in-simulation financial decisions.

17. The method of claim 16, wherein the virtual path further comprises a display element corresponding to the financial goal, wherein the display element is graphically emphasized or de-emphasized based on user selection of the nodes.

18. A provider computing system, comprising:
a processing circuit having a processor and a memory, wherein the processing circuit is configured to provide an interactive computer simulation of a life of a user via a user device operated by the user by:
determining a financial goal of the user;
accessing a financial transaction history of the user;
determining an initial state of the user based on the financial transaction history of the user;
determining a virtual path to the financial goal, wherein the initial state of the user is a starting point of the virtual path to the financial goal;
configuring the user device to display the virtual path to the financial goal, wherein the virtual path comprises the starting point of the virtual path to the financial goal and a plurality of interactive elements corresponding to a plurality of selectable in-simulation financial decisions configured to be selected by the user via the user device;
determining that the user has selected at least one of the plurality of selectable in-simulation financial decisions;
updating the virtual path to generate a first updated virtual path based on the selected at least one of the plurality of selectable in-simulation financial decisions, the first updated virtual path comprising a first updated plurality of interactive elements displayed on the user device and corresponding to a first updated plurality of selectable in-simulation financial decisions; and
configuring the user device to display the first updated virtual path;
determining, by the provider computing system, that the user has returned to the starting point of the virtual path and selected an additional one of the plurality of selectable in-simulation financial decisions, the additional one of the plurality of selectable in-simulation financial decisions being different than the at least one of the plurality of selectable in-simulation financial decisions;
updating, by the provider computing system, the virtual path to generate a second updated virtual path based on the selected additional one of the plurality of selectable in-simulation financial decisions; and
configuring, by the provider computing system, the user device to display the second updated virtual path;
wherein each of the plurality of interactive elements has a length corresponding to an estimated amount of time associated with executing an associated one of the plurality of selectable in-simulation financial decisions in real life.

19. A non-transitory computer-readable medium having processor-readable instructions stored thereon such that, when executed by a processor, the instructions cause the processor to provide an interactive computer simulation of a life of a user via a user device operated by the user by:
determining a financial goal of the user;
accessing a financial transaction history of the user;
determining an initial state of the user based on the financial transaction history of the user;
determining a virtual path to the financial goal, wherein the initial state of the user is a starting point of the virtual path to the financial goal;
configuring the user device to display the virtual path to the financial goal, wherein the virtual path comprises the starting point of the virtual path to the financial goal and a plurality of interactive elements corresponding to a plurality of selectable in-simulation financial decisions configured to be selected by the user via the user device;
determining that the user has selected at least one of the plurality of selectable in-simulation financial decisions;
updating the virtual path to generate a first updated virtual path based on the selected at least one of the plurality of selectable in-simulation financial decisions, the first updated virtual path comprising a first updated plurality of interactive elements displayed on the user device and corresponding to a first updated plurality of selectable in-simulation financial decisions; and
configuring the user device to display the first updated virtual path;
determining, by the provider computing system, that the user has returned to the starting point of the virtual path and selected an additional one of the plurality of selectable in-simulation financial decisions, the additional one of the plurality of selectable in-simulation financial decisions being different than the at least one of the plurality of selectable in-simulation financial decisions;
updating, by the provider computing system, the virtual path to generate a second updated virtual path based on the selected additional one of the plurality of selectable in-simulation financial decisions; and
configuring, by the provider computing system, the user device to display the second updated virtual path;
wherein each of the plurality of interactive elements has a length corresponding to an estimated amount of time associated with executing an associated one of the plurality of selectable in-simulation financial decisions in real life.

20. The method of claim 1, further comprising:
tracking an actual decision of the user; and
determining that the actual decision corresponds to one of the plurality of selectable in-simulation decisions, wherein determining that the user has selected at least one of the plurality of selectable in-simulation decisions comprises selecting the one of the plurality of selectable in-simulation decisions;
updating the virtual path to generate a plurality of parallel updated virtual paths;
saving the plurality of parallel updated virtual paths;
receiving user selection of one of the plurality of parallel updated virtual paths from the user device;
loading the selected one of the plurality of parallel updated virtual paths;
tracking a plurality of actual decisions of the user; and
comparing the plurality of actual decisions against previously made in-simulation decisions of the selected one of the plurality of parallel updated virtual paths;
wherein determining the financial goal of the user comprises one or more of:
  a) determining at least one recommended financial goal based on account information of the user;
  sending the at least one recommended financial goal to the user device; and
  receiving a selection of one or more of the at least one recommended financial goal from the user device, and
  b) identifying recommended financial goals defined by other users;
  sending the recommended financial goals to the user device; and
  receiving a selection of at least one of the recommended financial goals from the user device,
wherein determining the virtual path to the financial goal comprises one or more of:
  a) selecting one or more predetermined templates of the selectable in-simulation decisions that correspond to the financial goal, wherein the predetermined templates are stored in a database of the provider computing system,
  b) searching a database of the provider computing system for one or more of selectable in-simulation decisions defined by other users, selected in-simulation decisions selected by the other users, or actual decisions of other users; and
  setting the one or more of the selectable in-simulation decisions defined by the other users, the selected in-simulation decisions selected by the other users, or the actual decisions of other users as the plurality of selectable in-simulation decisions.

21. The method of claim 1, further comprising comparing, by the provider computing system, a first outcome associated with the first updated virtual path and a second outcome associated with the second updated virtual path to assist the user in determining whether the first updated virtual path or the second updated virtual path achieves a better outcome.

* * * * *